United States Patent [19]

Gilles

[11] Patent Number: 5,306,205

[45] Date of Patent: Apr. 26, 1994

[54] METHOD FOR PRODUCING MINCEMEAT

[75] Inventor: Christian Gilles, Northeim, Fed. Rep. of Germany

[73] Assignee: Sudfleisch GmbH, Fed. Rep. of Germany

[21] Appl. No.: 939,809

[22] Filed: Sep. 3, 1992

[30] Foreign Application Priority Data

Sep. 4, 1991 [DE] Fed. Rep. of Germany ....... 4129416

[51] Int. Cl.$^5$ .......................... A22C 7/00; B02C 19/12
[52] U.S. Cl. .................................... 452/198; 452/135; 452/138; 241/30; 241/282.1
[58] Field of Search ............... 452/198, 141, 135, 138; 241/17, 29, 30, 65, 82.2, 282.1

[56] References Cited

U.S. PATENT DOCUMENTS

| Re. 32,060 | 12/1985 | McFarland | 452/138 |
| 2,907,662 | 10/1959 | Covey | 99/187 |
| 3,677,775 | 2/1969 | Vogel | 99/174 |
| 4,657,190 | 4/1987 | Fischer et al. | 241/30 |
| 4,755,060 | 7/1988 | Pedersen | 241/282.1 |

FOREIGN PATENT DOCUMENTS

| 1131078 | 6/1962 | Fed. Rep. of Germany. |
| 3107576 | 9/1982 | Fed. Rep. of Germany. |
| 1572357 | 6/1969 | France. |
| 2513856 | 4/1983 | France. |
| 84/00472 | 2/1984 | PCT Int'l Appl. |

Primary Examiner—Willis Little
Attorney, Agent, or Firm—Seidel, Gonda, Lavorgna & Monaco

[57] ABSTRACT

The method of producing mincemeat in accordance with the invention by comminution of meat of slaughtered animals is characterized in that immediately after each other pieces of meat from freshly slaughtered and dismembered animals are comminuted, prior to the onset of rigor mortis, in a suitable device such as a bowl cutter and are shock chilled by the addition of a refrigerant until a meat temperature of between −1.6° C. and −10° C., more particularly −8° C., is reached, and further comminution is performed until the desired granule size is reached. Preferably the granulated meat is immediately deep frozen. The product is then placed in portions in packages, the air therein being replaced by a gas if desired, before the packages are sealed. The mincemeat is as a result completely fresh, almost completely free of bacteria and maintains its natural coloration for long periods of time.

13 Claims, 1 Drawing Sheet

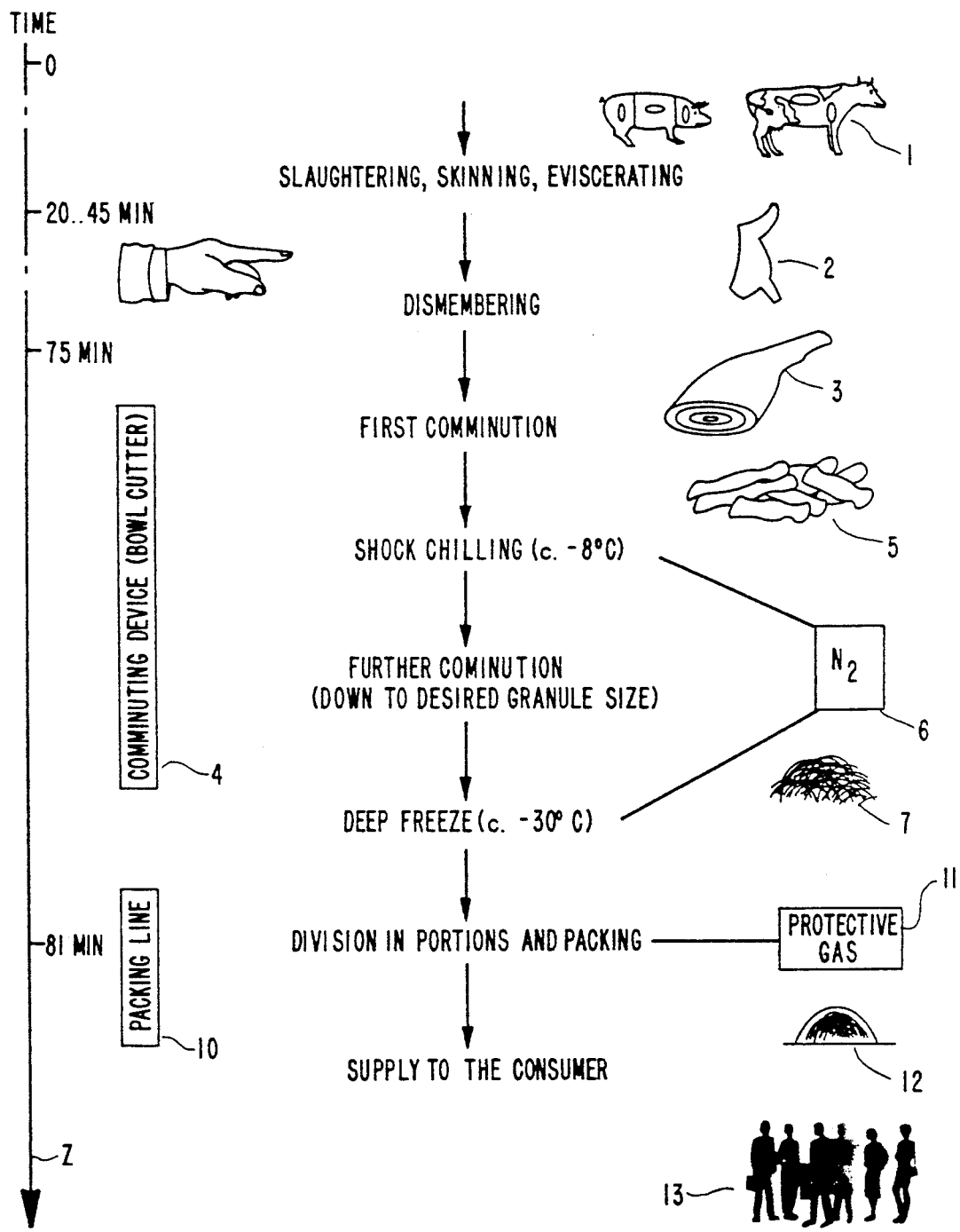

METHOD FOR PRODUCING MINCEMEAT

BACKGROUND OF THE INVENTION

The present invention relates to a method for the production of mincemeat by the comminution of meat of muscles of a slaughtered animal. According to estimates about 25% of all meat is sold as mincemeat.

The production of mincemeat is subject to various statutory basic conditions in different countries. Thus in Germany there is a provision in the Mincemeat Regulations (Hackfleischverordnung) that beef mincemeat may only contain a maximum of 20% fat and one portion may only come from the front quarter of a single animal, only certain parts of the meat being allowed. Mincemeat from refrigerated meat is presently only manufactured after the end of rigor mortis in the meat, which has matured by the degrading of energy-rich phosphates and after refrigerating, ripening, storage and shipping will be in a hygienically deteriorated condition. Fresh mincemeat may only be sold on the day it is produced and frozen mincemeat may not be sold later than three months after its production.

However in practice meat undergoes a substantial reduction in quality even prior to further processing to produce mincemeat. If mincemeat is produced by the butcher, the slaughtered animal will firstly have hung a few days in the cold store prior to being shipped and dismembered and in the butcher's store it will be handled a number of times on putting it in and taking it out of the cold store. Every morning a portion of the meat will be ground, the mincing machine accepting lumps of meat of the order of 4 to 5 cm in diameter. It is clear that the meat will be grasped in the hand many times over and will become microbiologically contaminated to a greater and greater extent in the course of time so that its condition will deteriorate.

In the case of mincemeat production in the retail food trade the meat is usually shipped in quarters from the slaughterhouse and dismembered and comminuted prior to sale, or such dismembering with and without packaging occurs on the slaughtering premises or as an additional stage in the trade in special purpose cutting up and packaging units, which pass on the meat to the retailer in a dismembered condition. At the retailer the packages are opened or the unpacked meat is cut into lumps in accordance with the size of the grinding machine and put in it. In the packaged and more particularly in the vacuum packaged condition the meat looses much juice, in which, despite cold storage, many bacteria accumulate. It is here again that microbiological contamination constitutes a substantial problem.

For the production of freeze-dried meat, which is suitable for the manufacture of certain types of boiling sausage there has been a proposal, see the German patent publication 3,107,576 A, to process meat still at slaughtering temperature even prior to the onset of rigor mortis, which is retarded by further salting the all-lean meat. Such salting however is responsible for a seepage of protein and to a lubricating effect, which renders the product unsuitable for mincemeat production.

In conjunction with the production of mincemeat there has been a further proposal, see Patent Abstracts of Japan 58-101641 (A), to comminute meat in a refrigerated condition at $-2°$ C. to $-10°$ C. and then to extrude it as a product which is in practice mostly sold as an animal feedstuff. The problems in conjunction with improving quality of mincemeat may not be dealt with by these technologies.

SUMMARY OF THE INVENTION

On the other hand the present invention has as one object avoiding microbiological contamination during the production of mincemeat as far as possible and of obtaining the mincemeat with a stability of coloration, odor and flavor and further with a microbacterial resistance in a condition which is typical for meat at the slaughtering temperature owing to its high redox potential and prior to the degradation of energy-rich phosphate compounds.

This is achieved by the invention in a method for the production of mincemeat by the comminution of, particularly all-lean, meat of muscles from a carcass, characterized in that pieces of meat of the freshly slaughtered and dismembered carcass and prior to onset of rigor mortis are further comminuted in a comminuting apparatus and are shock-chilled down to a temperature of the meat which is under $0°$ C. and are then further comminuted until the desired granule size is reached, such working operations being performed directly one after the other, rigor mortis of the pieces of meat being prevented by immediate further processing without the addition of salt or of another chemical.

DESCRIPTION OF THE DRAWING

The single FIGURE illustrates the process steps according to the present invention in the form of a flow chart.

DETAILED DESCRIPTION OF THE PREFERRED EMBODIMENT

In accordance with the invention the onset of rigor mortis is prevented without the use of salt or any other chemical and by the very rapid sequence of the processing steps.

The significance of the invention will be gathered from the advantages, which are produced during production of mincemeat from meat at the slaughtering temperature, that is to say:

the surface of the freshly skinned carcass will only be subject to the unavoidable, slight contamination due to skinning and eviscerating. So far, there will as yet be no cold storage flora resistant to cold on the surface of the meat.

The contaminating flora does not have any time to reproduce.

Since there is only a slight contamination of the surface of the carcass there will be but a slight contamination of the equipment and of the hands of the workers and consequently of the fresh surface of the pieces of all-lean meat.

Owing to the high quantity of adenosine triphosphate (ATP) meat at the slaughtering temperature has a very good ability to bind water, that is to say there is very little free water available for bacterial metabolism. This also applies for any thawing phase.

The granule structure of the meat subjected to a further step in accordance with the invention, that is to say in which during further comminution the granulated meat is deep frozen partly or is completely deep frozen thereafter and is then packaged in portions which are hermetically sealed gives the consumer various other advantages from the point of view of kitchen hygiene. The comminution into granules, which are almost able to flow, renders it possible to divide up the product portions in the frozen condition. For the production of mincemeat products (sauce dishes, rissoles) previous thawing is unnecessary. Working in salt and spices is possible in the unthawed condition.

Until complete freezing occurs only 90 minutes are necessary in the new process, whereas in technologies so far used at least 24 hours and frequently several days were necessary.

In the case of mincemeat production in accordance with the invention the degrading of adenosine triphosphate (ATP) to adenosine diphosphate (ADP) is kept at a very low rate. The high level of ATP in the meat at slaughtering temperature is responsible for the very satisfactory ability to bind water.

During the further use of the chilled or frozen mincemeat manufactured in the method in accordance with the invention advantages as regards hygiene result from the granular structure of the product. Such structure renders possible division into portions in the frozen condition and the incorporation of spices.

In accordance with the invention the meat still at the slaughtering temperature is dressed within the first two hours after slaughtering, shock refrigerated and comminuted by means of a suitable device. In this respect a bowl cutter or bowl slicer, or a mincing or grinding machine are suitable, a bowl cutter being preferred since it renders possible continuous operation without reloading the intermediate products between the individual method steps. The application of the invention to the use of a mincing machine (grinding machine) is on the one hand possible for instance by the use of a device as suggested in the German patent publication 2,746,176 C with refrigeration during comminution.

It is convenient for refrigeration to be performed with liquid or solid inert gas, as for instance liquid nitrogen, as is suggested in the German patent publication 3,347,937 A1 for bowl cutters, the temperature being between $-2°$ C. and $-10°$ C. A satisfactory cutting temperature when using a bowl cutter has proved to be $-8°$ C., but if the temperature is less much dust is produced during cutting, which seems to render the product less attractive. This shock chilling and comminution may be performed in a very short time, it being possible to reduce the processing time to approximately 6 minutes.

In accordance with a preferred form of the method the procedure is as follows:

In the case of beef dismembering of the carcasses is commenced immediately after slaughtering, that is to say approximately 20 to 45 minutes dependent on the slaughtering unit or establishment, such dismembering lasting perhaps a further 30 minutes. During dismembering the meat produced directly and still at the slaughtering temperature is freed of bones and tendons, gristle and adhering fat so that only musculature is left. The resulting pieces of meat, which have a weight of approximately ½ kg to 10 kg and on average 4 to 5 kg, are then immediately fed into the comminuting device so that there is no further contact with the human hand: the meat has only been exposed to the environment for a short time and microbiological contamination is at a minimum, more particularly if high standards of cleanliness are observed in the area where the meat is dismembered. The bowl cutter, for instance one constituting part of a comminuting device, is kept closed to exclude air when running, i. e. by having the lid on, and is operated for approximately two rotations, i. e. for a short time in cutting operations so that a first comminution occurs to produce strip-like portions of approximately 3 to 8 cm in size, following which mixing operation is commenced and liquid nitrogen is added. During the mixing operation the meat, if it is to be later deep frozen, is firstly preferably refrigerated down to $-8°$ C., for which purpose this operation involving adding liquid nitrogen and freezing is performed for approximately 160 seconds. In any event refrigerating should be down to at least $-1.6°$ C. Now the bowl cutter is switched back to the cutting mode and the frozen meat is comminuted down to the desired size of granule in accordance with the article to be manufactured, that is to say generally to a meat granule size of 2 mm to 6 mm.

The resulting product may now be removed as fresh mincemeat. However it is preferably deep frozen by further refrigeration while still in the same machine.

After this second cutting operation, for deep freezing the mixing operation is restarted and further liquid nitrogen fed so that the granulated meat is refrigerated down to between $-18°$ C. and $-30°$ C. The deep frozen mincemeat in granules is then separated into portions in packages using a special refrigerating transport system, such packages being hermetically sealed, although however in the case of more particularly pork mincemeat which is sensitive to chillblains, the product is so processed that the air in the interstices between the granules has its place taken by a protective gas mixture, following which the package is sealed, labeled and stored in deep freeze.

The stages in the method in accordance with the invention may be best seen from the accompanying schedule which shows a flow chart by way of example for the production of mincemeat in accordance with the invention.

The schedule relates to the production of mincemeat from bovine animals or swine 1. The first step comprises slaughtering, skinning and eviscerating. As marked on the symbolic time axis Z approximately 20 to 45 minutes are necessary for this, dependent on the slaughterhouse. In the next step the carcass parts 2 are coarsely dismembered, resulting in pieces 3 of meat weighing approximately some kg each which are as a result ready for processing by machine. The first two method steps are finished after approximately 75 minutes. This marks the end of manual operations on the meat to be dealt with.

The pieces 3 of meat are placed in a bowl cutter 4 in which prior to the onset of rigor mortis and without the addition of salt or other chemicals (used in the prior art to retard rigor mortis), initial comminution is performed on the coarse pieces 3 of meat by running the cutter for approximately two revolutions in the cutting mode. The result is then strip-like pieces 5 of a length of some centimeters and a weight of approximately 20 to 100 g at a temperature of approximately 30° C.

Owing to the use of a refrigerant 6, that is to say liquid nitrogen in the example described, in the mixing mode of the bowl cutter directly following the above noted cutting operation, the pieces 5 of meat are rapidly refrigerated down to a temperature of $-1.6°$ C. at the most, this being the degree of cold at which the meat solidifies, and preferably, if the mincemeat is to be then deep frozen, the meat is shock frozen. In the case of the use of the bowl cutter 4 a temperature of $-8°$ C. has proved to be the optimum cutting temperature. Above 0° C. the ensuing cutting of the meat would lead to a mash and not to a granular mass. The refrigerating time may last between 2 and 3 minutes or even somewhat longer.

The refrigerating or shock freeze operation is then immediately followed by a further cutting operation in the cutting mode in the same machine until the pieces 5 of meat have the desired granule size. The mincemeat 7 will then have the desired form.

While still in the bowl cutter 4 the mincemeat mass 7 is deep frozen by the addition of further refrigerant. The addition of the refrigerant may commence prior to the end of the preceding cutting operation. Temperatures of approximately $-18°$ C. to $-30°$ C. are conventional.

The deep frozen, granular mincemeat mass 7 may now be automatically removed from the bowl cutter 4, refrigerating of the conveying means being advantageous. The last step of the method consists of packaging the frozen mincemeat with the aid of refrigerated packaging machines 10 putting the mincemeat into portions. These machines 10 as well are also preferably refrigerated. Preferably during the packaging with the portioning and packaging machines 10 the mincemeat is hermetically sealed and the air is replaced by a protective gas. The individual portions 12 of mincemeat may then be passed on to the consumers 13.

As is to be seen from the time axis Z the time taken from placing in the bowl cutter 4 to sealing the packages is approximately 6 minutes. The meat is only touched by hand in the first steps of the process. The meat is processed and deep frozen in a completely fresh condition and has a very low microbial count so that the consumer may be certain of a very safe product. Unlike conventional mincemeat, which in the conventional atmospheric surroundings looses its natural flesh-red color even after a short time, the novel operation as described in the above renders it possible to keep the natural coloration and typical intensive odor and flavor for a very long time. There is no graying and the bright red color of the meat is even revived again during later thawing. This may be ensured by renewed oxygenation of the muscle pigment myoglobin, that is to say changing it back into oxymyoglobin. A further advantage of the use of deep freezing performed directly after slaughtering is that any parasites possibly present in the meat and not detected during inspection of the meat, such as cysticerci, trichina, toxoplasma and sarcosporidia, are reliably killed off. The mincemeat may be consumed in the raw condition completely safely, for instance in the form of minced steak. The natural coloration is maintained for long periods of time even in the case of pork by the protective atmosphere. The method is therefore suitable both for beef and also for pork, it being possible to add salt and spices such as pepper after comminution.

If a mincing machine is to be utilized in place of a bowl cutter, the following sequence is proposed:

1. For the first comminution a normal mincing machine, for instance with an 8 mm perforated disk is used.

2. For refrigerating and further comminution a refrigerated mixing and conveying screw is necessary, which must be able to be refrigerated down to a temperature not above $-1.6°$ C. and for this purpose should have a length of the order of 1 meter.

3. A cutting means is provided at the front end of the screw, which cuts the refrigerated pieces of meat to mincemeat.

These steps are again performed in rapid succession.

Other comminuting equipment, besides bowl cutter and mincing machines, is also suitable if it can be fitted with a refrigerating device.

In the following table data are presented as regards bacterial counts after thawing on the mincemeat manufactured in accordance with the invention.

| Type of mincemeat | Aerobic mesophilics KbE/g | Colibacteria (entero.) KbE/g | Sulfite reducing anaerobics KbE/g | Staphylococcus aureus KbE/g | Salmonellae in 25 g |
|---|---|---|---|---|---|
| Minced steak (for raw consumption) | | | | | |
| 1 | $1.3 \cdot 10^4$ | $1.3 \cdot 10^2$ | <10 | <50 | n.d. |
| 2 | $7.3 \cdot 10^3$ | $1.3 \cdot 10^2$ | <10 | <50 | n.d. |
| 3 | $8.0 \cdot 10^3$ | $1.1 \cdot 10^2$ | <10 | <50 | n.d. |
| 4 | $3.5 \cdot 10^4$ | $1.0 \cdot 10^2$ | <10 | <50 | n.d. |
| 5 | $8.0 \cdot 10^3$ | $1.0 \cdot 10^2$ | <10 | <50 | n.d. |
| Beef, 12% fat | | | | | |
| 1 | $7.0 \cdot 10^3$ | 13 | <10 | <50 | n.d. |
| 2 | $7.5 \cdot 10^3$ | 3 | <10 | <50 | n.d. |
| 3 | $2.3 \cdot 10^3$ | 50 | <10 | <50 | n.d. |
| 4 | $5.0 \cdot 10^3$ | 90 | <10 | <50 | n.d. |
| 5 | $5.0 \cdot 10^3$ | 50 | <10 | <50 | n.d. |
| Beef, 20% fat | | | | | |
| 1 | $7.0 \cdot 10^3$ | 15 | <10 | <50 | n.d. |
| 2 | $4.3 \cdot 10^3$ | 35 | <10 | <50 | n.d. |
| 3 | $5.5 \cdot 10^3$ | 20 | <10 | <50 | n.d. |
| 4 | $4.0 \cdot 10^3$ | 5 | <10 | <50 | n.d. |
| 5 | $4.0 \cdot 10^3$ | 3 | <10 | <50 | n.d. |
| Pork, 40% fat | | | | | |
| 1 | $5.5 \cdot 10^3$ | 50 | <10 | 50 | n.d. |
| 2 | $3.5 \cdot 10^3$ | 50 | <10 | <50 | n.d. |
| 3 | $6.0 \cdot 10^3$ | 23 | <10 | <50 | n.d. |
| 4 | $4.5 \cdot 10^3$ | 25 | <10 | <50 | n.d. |
| 5 | $7.0 \cdot 10^3$ | 50 | <10 | <50 | n.d. |
| Limit values | | | | | |
| m | $5 \cdot 10^5$ | 50 | 10 | 50 | n.d. |
| M | $5 \cdot 10^6$ | $5 \cdot 10^2$ | 100 | $5 \cdot 10^2$ | in 25 g. |

Abbreviations:
n.d. none detected, m, satisfactory value, M maximum limit.

I claim:

1. A method for the production of mincemeat by the comminution of meat of muscles from a carcass of a slaughtered animal, characterized in that pieces of meat of the freshly slaughtered and dismembered carcass and prior to onset of rigor mortis are subjected to a first comminuting operation in a comminuting apparatus and are shock-chilled down to a temperature of the meat under 0° C. and are then further comminuted until the desired granule size is reached, such working operations being performed directly one after the other, rigor mortis of the pieces of meat being prevented by immediate further processing without the addition of salt or of another chemical.

2. The method as claimed in claim 1, characterized in that after or partly during the second comminuting operation the granulated meat is deep frozen while still in the comminuting apparatus and is then placed in packages in portions, such packages being hermetically sealed.

3. The method as claimed in claim 1, characterized in that the first comminuting operation on the meat, shock chilling it to a temperature under 0° C., the second comminuting operation and any deep freeze step are performed in a bowl cutter.

4. The method as claimed claim 1, characterized in that the pieces of meat are shock chilled in the comminuting device prior to the second comminuting operation to a temperature amounting to between −6° C. and −10° C. and preferably −8° C.

5. The method as claimed in claim 2, characterized in that the pieces of meat are shock chilled in the comminuting device prior to the second comminuting operation to a temperature amounting to between −6° C. and −10° C. and preferably −8° C.

6. The method as claimed in any one of the claims 2, 3 or 5, characterized in that for shock chilling and for any subsequent deep freezing in the comminuting device an inert gas in a liquid or solid condition, and preferably liquid nitrogen is mixed with the meat.

7. The method as claimed in any one of the claims 2, 3, or 5, characterized in that the pieces of meat of the dismembered carcass of a freshly slaughtered animal have a weight of 0.5 to 10 kilograms, which pieces are placed in the comminuting device and prior to shock chilling are comminuted to produce pieces of meat with a weight of 20 grams to 100 grams.

8. The method as claimed in claim 7, characterized in that after the placing of the pieces of meat of the freshly slaughtered and dismembered carcass therein such bowl cutter is firstly operated in a closed condition for two revolutions and then shock freezing is commenced.

9. The method as claimed in any one of the claims 2, 3, 4, or 5, characterized in that for division up into portions and packaging of the granulated meat the meat is passed from the bowl cutter to an automatic packaging line without making manual contact and any air still in the packages is drawn off and replaced by a protective gas.

10. The method as in claimed in claim 9, characterized in that conveying passages from the comminuting device to the packaging line and the packaging line are refrigerated.

11. The method as claimed in claim 1, characterized in that for comminution and shock chilling to a temperature between −6° C. and −10° C. a mincing machine is utilized, shock chilling being performed along a mixing and conveying screw.

12. The method as claimed in any one of the claims 2, 3 or 5 characterized in that for shock chilling and for any subsequent deep freezing in the comminuting device an inert gas in a liquid or solid condition, and preferably liquid nitrogen is mixed with the meat and that the pieces of meat of the dismembered carcass of a freshly slaughtered animal have a weight of 0.5 to 10 kilograms, which pieces are placed in the comminuting device and prior to shock chilling are comminuted to produce pieces of meat with a weight of 20 grams to 100 grams.

13. The method as claimed in claim 12 characterized in that after the placing of the pieces of meat of the freshly slaughtered and dismembered carcass therein such bowl cutter is firstly operated in a closed condition for two revolutions and then shock freezing is commenced.

* * * * *